United States Patent
Nikitin et al.

(10) Patent No.: US 7,927,724 B2
(45) Date of Patent: Apr. 19, 2011

(54) MAGNETIC RECORDING MEDIA WITH ORTHOGONAL ANISOTROPY ENHANCEMENT OR BIAS LAYER

(75) Inventors: Vladimir R. Nikitin, Campbell, CA (US); Changqing Shi, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 1756 days.

(21) Appl. No.: 10/857,775

(22) Filed: May 28, 2004

(65) Prior Publication Data

US 2005/0266275 A1    Dec. 1, 2005

(51) Int. Cl.
*G11B 5/66* (2006.01)

(52) U.S. Cl. ......... 428/827; 428/826; 428/828; 428/829

(58) Field of Classification Search ............ 428/694
See application file for complete search history.

(56) References Cited

U.S. PATENT DOCUMENTS

| | | |
|---|---|---|
| 5,176,965 A | 1/1993 | Mallary |
| 5,851,643 A | 12/1998 | Honda et al. |
| 6,280,813 B1 | 8/2001 | Carey et al. |
| 6,495,252 B1 | 12/2002 | Richter et al. |
| 6,602,612 B2 | 8/2003 | Abarra et al. |
| 6,641,935 B1 | 11/2003 | Li et al. |
| 6,645,614 B1 | 11/2003 | Girt et al. |
| 6,686,070 B1 | 2/2004 | Futamoto et al. |
| 2001/0051287 A1* | 12/2001 | Kikitsu et al. ......... 428/694 ML |
| 2002/0028355 A1 | 3/2002 | Nakamura et al. |
| 2002/0028356 A1 | 3/2002 | Kawato et al. |
| 2002/0028357 A1 | 3/2002 | Shukh et al. |
| 2002/0058160 A1 | 5/2002 | Oikawa et al. |
| 2002/0127433 A1 | 9/2002 | Shimizu et al. |
| 2003/0017364 A1* | 1/2003 | Kikitsu et al. ........... 428/693 |
| 2003/0022023 A1 | 1/2003 | Carey et al. |
| 2003/0099869 A1 | 5/2003 | Oikawa et al. |
| 2003/0104247 A1 | 6/2003 | Girt |
| 2003/0162057 A1* | 8/2003 | Matsunuma et al. .... 428/694 TS |
| 2004/0023073 A1* | 2/2004 | Shimizu et al. ....... 428/694 MM |
| 2004/0053078 A1* | 3/2004 | Kikitsu et al. ........ 428/694 TM |
| 2004/0157034 A1* | 8/2004 | Watanabe et al. .......... 428/65.3 |
| 2004/0247945 A1* | 12/2004 | Chen et al. ............. 428/694 TS |
| 2005/0266275 A1* | 12/2005 | Nikitin et al. .................. 428/831 |
| 2006/0228586 A1* | 10/2006 | Girt et al. ...................... 428/828 |

FOREIGN PATENT DOCUMENTS

| | | |
|---|---|---|
| JP | 5189737 A1 | 7/1993 |
| JP | 7073430 A1 | 3/1995 |
| JP | 10208935 A1 | 8/1998 |
| JP | 2002298323 A1 | 10/2002 |

* cited by examiner

*Primary Examiner* — Mark Ruthkosky
*Assistant Examiner* — Gary D Harris
(74) *Attorney, Agent, or Firm* — G. Martin Knight

(57) ABSTRACT

The recording medium according to the invention has a magnetic recording layer, an exchange coupling layer and an enhancement or bias layer with an anisotropy orthogonal to the recording layer. The enhancement layer is designed to have no significant remanent magnetization and preferably to saturate under the write head. The enhancement layer creates an exchange field normal to the anisotropy of the recording layer and has the effect of rotating the magnetization of the recording layer and lowering the required switching field, i.e., the coercivity. The invention can be embodied in a longitudinal recording medium or a perpendicular recording medium. The exchange coupling can either ferromagnetic or antiferromagnetic. The bias layer has a high KuV and anisotropy and is designed to have high thermal stability and minimize the rotation of magnetization with the head field.

9 Claims, 7 Drawing Sheets

The Energy Barrier:
$$E_b = \left(1 - \frac{H_{bias}}{H_k}\right)^2 \quad_{51}$$

The Switching Field:
$$H_{sw} = \sqrt{H_{nuc}^2 - H_{bias}^2} \quad_{52}$$

with
$$H_{nuc} = \frac{H_k}{\left(\sin^{2/3}\varphi + \cos^{2/3}\varphi\right)^{3/2}}$$

where
$$\varphi = \arctan\left(\frac{H_{bias}}{H_{sw}}\right)$$

Fig. 5

MAGNETIC RECORDING MEDIA WITH ORTHOGONAL ANISOTROPY ENHANCEMENT OR BIAS LAYER

FIELD OF THE INVENTION

The invention relates to magnetic storage devices and magnetic recording media for magnetic recording and more particularly to means for controlling the magnetic fields in the media during recording and maintaining long term magnetic stability.

BACKGROUND OF THE INVENTION

A typical prior art a disk drive system 10 using longitudinal recording is illustrated in FIG. 1. In operation the magnetic transducer (head) 20 is supported by the suspension (not shown) as it flies above the rotating disk 16. The magnetic transducer 20, usually called a "head" or "slider," is composed of elements that perform the task of writing magnetic transitions (the write head 23) and reading the magnetic transitions (the read head 12). The magnetic transducer 20 is positioned over points at varying radial distances from the center of the disk 16 to read and write circular tracks (not shown). The disk 16 is attached to a spindle (not shown) driven by a spindle motor (not shown) to rotate the disk 16. The disk 16 comprises a substrate 26 on which a plurality of thin films 21 are deposited. The thin films 21 include ferromagnetic material in which the write head 23 records the magnetic transitions in which information is encoded.

The thin films 21 on the disk 16 typically include a chromium or chromium alloy underlayer which is deposited on the substrate 26. The ferromagnetic layer in the thin films is based on various alloys of cobalt, nickel and iron. For example, a commonly used alloy is CoPtCr. Additional elements such as tantalum and boron are often used in the magnetic alloy. A protective overcoat layer is used to improve wearability and corrosion. Various seed layers, multiple underlayers and laminated magnetic films have all been described in the prior art. In a disk drive using perpendicular recording the recording head is designed to direct magnetic flux through the recording layer in a direction which is perpendicular to the plane of the disk. Typically the disk for perpendicular recording has a hard magnetic recording layer and a magnetically soft underlayer. During recording operations using a single-pole type head, magnetic flux is directed from the main pole of the recording head perpendicularly through the hard magnetic recording layer, then into the plane of the soft underlayer and back to the return pole in the recording head.

U.S. Pat. No. 6,531,202 to Litvinov, et al. is an example of a magnetic recording medium for perpendicular or vertical recording. The medium includes a a magnetically soft underlayer deposited on the substrate. Suitable soft magnetic materials for the underlayer are said to include CoFe and alloys thereof, FeAlN, NiFe, CoZrNb and FeTaN, with CoFe and FeAlN being preferred soft materials. A magnetically hard recording layer is deposited on the soft underlayer. Suitable hard magnetic materials for the recording layer are said to include multilayers of Co/Pd or Co/Pt, L10 phases of CoPt, FePt, CoPd and FePd and hcp Co alloys, with such multilayers and L10 phases being preferred hard materials.

In contrast to perpendicular recording, longitudinal recording media typically uses a non-magnetic underlayer under the ferromagnetic recording layer. Typical underlayer materials are chromium and various alloys of chromium. In order to maintain thermal stability for long duration storage of data, the coercivity of the magnetic recording layer must be kept high. High coercivity, in turn, places large demands on the field generated by the write head and results in poor overwriting (OW) and poor field gradients. The field generated by the write head can be the limiting factor for increasing recording density.

In U.S. Pat. No. 6,524,730 to Ga-Lane Chen a soft magnetic underlayer for vertical recording is referred as "keeper layer". The soft underlayer is said to give better writing efficiency by pulling the magnetic flux down from the writing pole of a head of the magnetic recording medium. Examples given of soft magnetic materials are NiFe, CoZrNb, FeAlNx.

In U.S. Pat. No. 6,495,252 to Richter, et al., a recording medium with a superparamagnetic underlayer is described and asserted to solve problems arising from the generation of Barkhausen noise in magnetic recording media employing magnetically soft underlayers, e.g., of NiFe (Permalloy). According to the specification, high bit density magnetic recording, storage, and retrieval media of either perpendicular or longitudinal type substantially free of Barkhausen noise are fabricated by substituting a layer or film of a very finely grained (i.e., polycrystalline), magnetically soft material for the continuous, magnetically soft films or layers conventionally utilized as underlayers. The grain size of the ferromagnetic or ferrimagnetic material utilized for the magnetically soft underlayer is sufficiently small, such that the grains thereof become superparamagnetic, i.e., they remain magnetically ordered but lose their hysteresis. Although Richter, et al., assert that the described media can be used for longitudinal recording, every example given is for perpendicular recording. No mention is made as to how the media should be changed to function in longitudinal recording.

In U.S. Pat. No. 6,280,813 to Carey, et al. a layer structure is described that includes at least two ferromagnetic films antiferromagnetically coupled together across a nonferromagnetic coupling/spacer film. In general, it is said that the exchange coupling oscillates from ferromagnetic to antiferromagnetic with increasing coupling/spacer film thickness and that the preferred 6 angstrom thickness of the ruthenium coupling/spacer layer was selected because it corresponds to the first antiferromagnetic peak in the oscillation for the particular thin film structure. Materials that are appropriate for use as the nonferromagnetic coupling/spacer films include ruthenium (Ru), chromium (Cr), rhodium (Rh), iridium (Ir), copper (Cu), and their alloys. Because the magnetic moments of the two antiferromagnetically coupled films are oriented antiparallel, the net remanent magnetization-thickness product (Mrt) of the recording layer is the difference in the Mrt values of the two ferromagnetic films. This reduction in Mrt is accomplished without a reduction in the thermal stability of the recording medium because the volumes of the grains in the antiferromagnetically coupled films add constructively. An embodiment of the structure includes two ferromagnetic CoPtCrB films, separated by a Ru spacer film having a thickness selected to maximize the antiferromagnetic exchange coupling between the two CoPtCrB films. The top ferromagnetic layer is designed to have a greater Mrt than the bottom ferromagnetic layer, so that the net moment in zero applied magnetic field is low, but nonzero. The Carey '813 patent also states that the antiferromagnetic coupling is enhanced by a thin (5 Angstroms) ferromagnetic cobalt interface layer added between the coupling/spacer layer and the top and/or bottom ferromagnetic layers.

SUMMARY OF THE INVENTION

A recording medium according to the invention has a magnetic recording layer exchange coupled to an enhancement layer which has anisotropy orthogonal to the recording layer. Embodiments of the invention can be used for longitudinal or perpendicular recording. An embodiment for longitudinal recording has a recording layer with longitudinal anisotropy, a coupling layer and an enhancement layer with perpendicular anisotropy. An embodiment for perpendicular recording has a recording layer with perpendicular anisotropy, a coupling layer and an enhancement layer with longitudinal anisotropy. When the perpendicular enhancement layer is saturated, an exchange field normal to the recording layer exists and has the effect of lowering the required longitudinal switching field, i.e., the longitudinal coercivity. The recording layer and enhancement layer are exchanged coupled across a coupling layer. The exchange coupling can either ferromagnetic or antiferromagnetic. The orthogonal anisotropy enhancement layer is designed to reduce the required switching field for recording layer during the writing process while having no effect on long term thermal stability. The enhancement layer material is designed to have moderate Hk, small grain volume, and a KuV that results in the material being ferromagnetic on a timescale in which recording occurs, but is otherwise superparamagnetic so that it has no significant effect on the energy barrier for switching the recording layer. The enhancement layer is designed to have no significant remanent magnetization and preferably to saturate in an area under the write head where the magnetic field orthogonal to the writing field is relatively high.

The media of the invention can be used with conventional longitudinal write heads which generate vertical and longitudinal field components. For longitudinal recording the orthogonal magnetic field is the vertical field which is stronger around the P2 write head pole. In an embodiment of the invention using ferromagnetic coupling between the enhancement layer and the recording layer the tilted field of the head near P2 will switch both layers at approximately the same time. In an embodiment of the invention using antiferromagnetic coupling between the enhancement layer and the recording layer the media of the invention is moved in the direction from P2 to P1 which is the reverse of conventional longitudinal recording. As the media is moved under P2 the enhancement layer will switch first and as the media is moved toward P1, the vertical field decreases and the longitudinal field increases reaching a point where the longitudinal field is strong enough to switch the magnetization in the recording layer. During long term storage the media is not subjected to a vertical field and the enhancement layer has no significant effect on the recording layer. The recording media of the invention can also be used with a write head symmetric poles, that is, one in which the poles have approximately the same surface area facing the media.

For perpendicular recording a single pole write head with a shielded pole design can be used with the media of the invention.

BRIEF DESCRIPTION OF THE FIGURES

FIG. 5 gives a set of equations which aid in understanding the principles of the invention.

DETAILED DESCRIPTION OF THE INVENTION AND THE PREFERRED EMBODIMENTS

The invention will first be described in detail for an embodiment using longitudinal recording. In a magnetic storage device according to a first embodiment of the invention it is the longitudinal field, not the vertical field component, which writes the magnetic orientation for the bit domain in the magnetic recording layer. The magnetic recording layer is, therefore, fabricated with longitudinal anisotropy. The vertical exchange field generated by the perpendicular anisotropy enhancement layer acts to lower the dynamic coercivity of the recording layer to allow a weaker longitudinal magnetic field to write the bit. The invention allows the static coercivity of magnetic recording layer to be sufficiently high to maintain thermal stability despite extremely small grain size.

Figure 1:
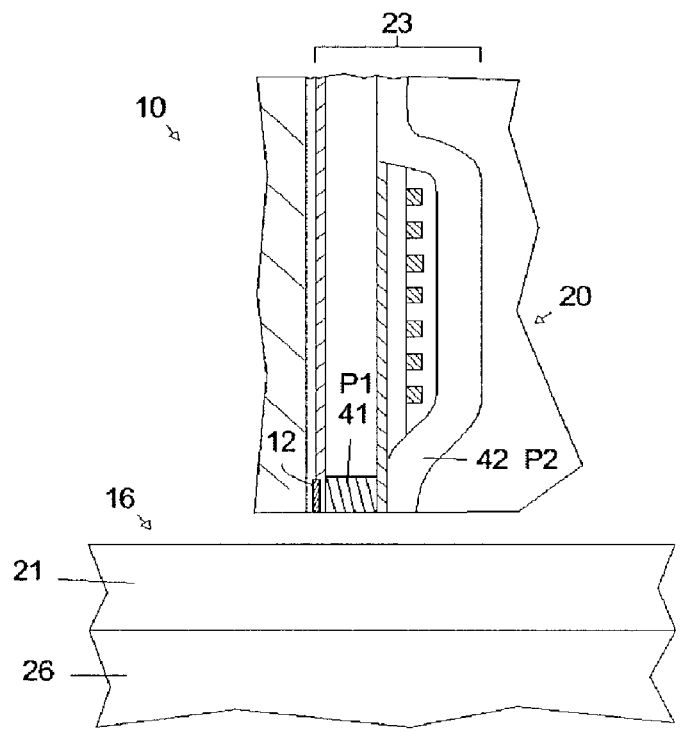
FIG. 1 is an illustration of selected components of a prior art disk drive in which the invention can be embodied.
Figure 2:
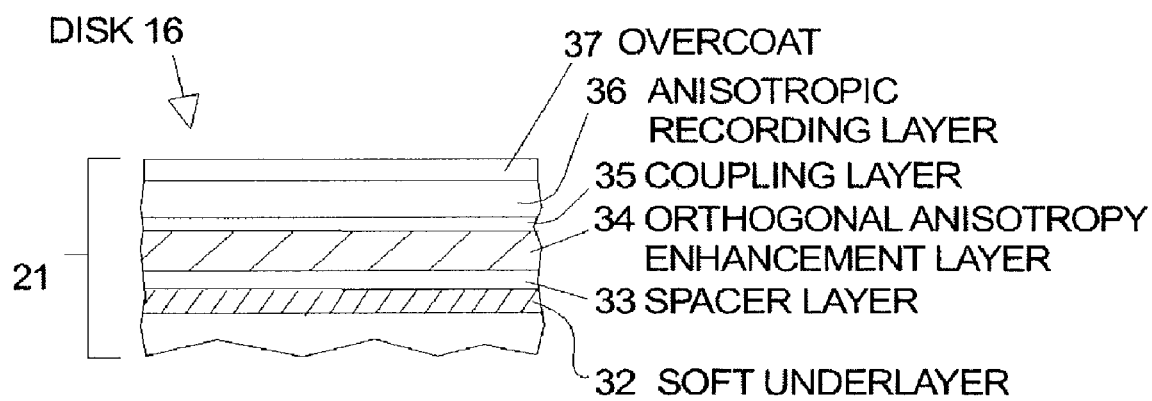
FIG. 2 is an illustration of section of a thin film disk according to an embodiment the invention taken perpendicular to the plane of the thin films which includes an orthogonal anisotropy enhancement layer.
Figure 3:
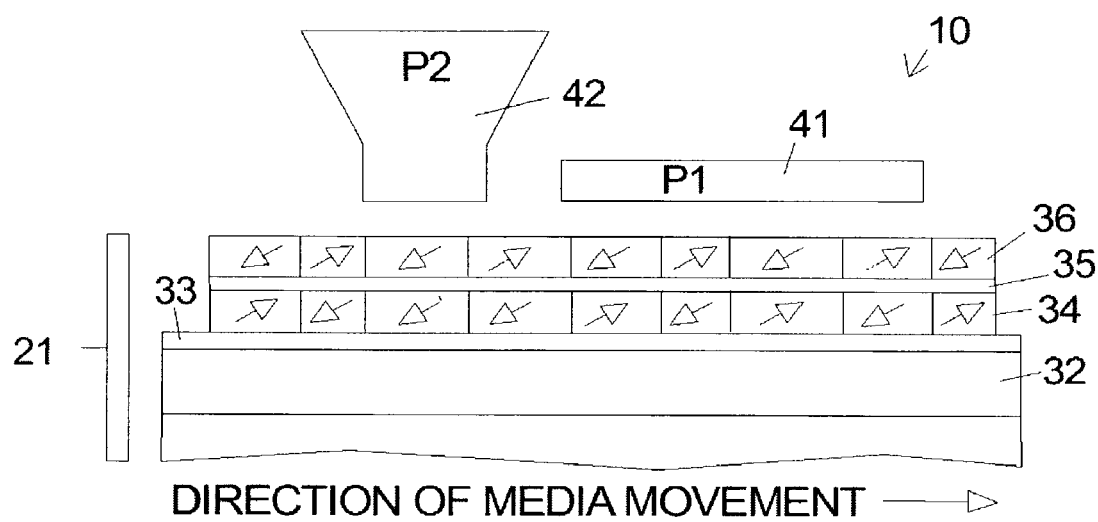
FIG. 3 is an illustration of selected components of a disk drive embodying the invention showing the poles of the write head writing longitudinal magnetic domains in a recording medium on a disk.
Figure 4:
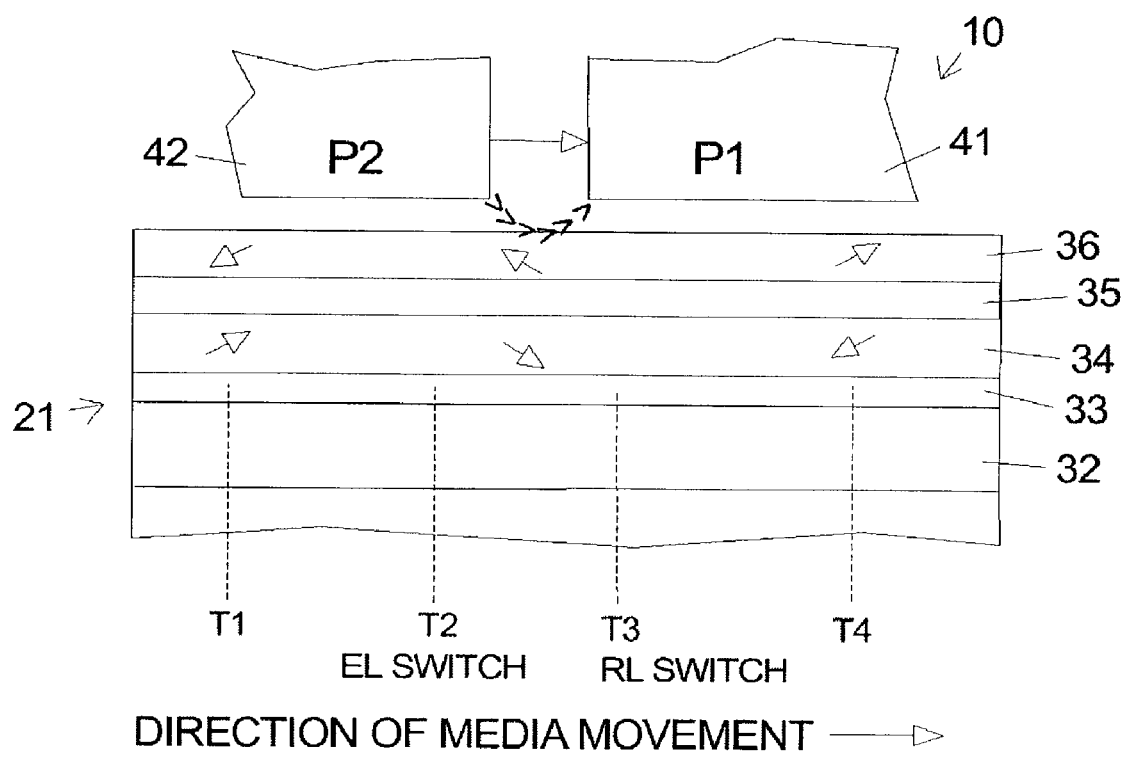
FIG. 4 is an enlarged view of the region between the poles of the write head illustrating a sequence of times during the writing of longitudinal magnetic domains in a recording medium according to the invention.

FIG. 2 illustrates a section of the thin films 21 on a disk 16 for longitudinal recording according to an embodiment of the invention. The thicknesses of the films are not according to scale. The actual thicknesses can be determined according to the prior art. The soft underlayer 32 is made of a magnetically soft material. Many soft magnetic materials are known and can serve as the underlayer. Essentially any magnetic material that is not "hard" is a candidate for use in the soft underlayer 32. A preferred material is NiFe (permalloy) which is used extensively in magnetic recording heads. The soft underlayer 32 is separated from the orthogonal anisotropy enhancement layer 34 by a non-magnetic spacer layer 33. The thickness of the non-magnetic spacer layer 33 is used to control the influence of the soft underlayer 32 according to prior art principles and the design goals described herein. The enhancement layer 34 is separated from the anisotropic recording layer 36 by a non-magnetic coupling layer 35. The enhancement layer 34 can ferromagnetically or antiferromagnetically coupled to the recording layer 36. The coupling layer is preferably ruthenium (Ru). The recording layer 36 can be a single layer of magnetic material or a plurality of layers forming a layer structure which is known for use in longitudinal or perpendicular recording. A protective overcoat 37 is conventionally the last thin film on the disk. In FIGS. 3 and 4 the overcoat is omitted to increase the clarity of the illustration.

Figure 7:
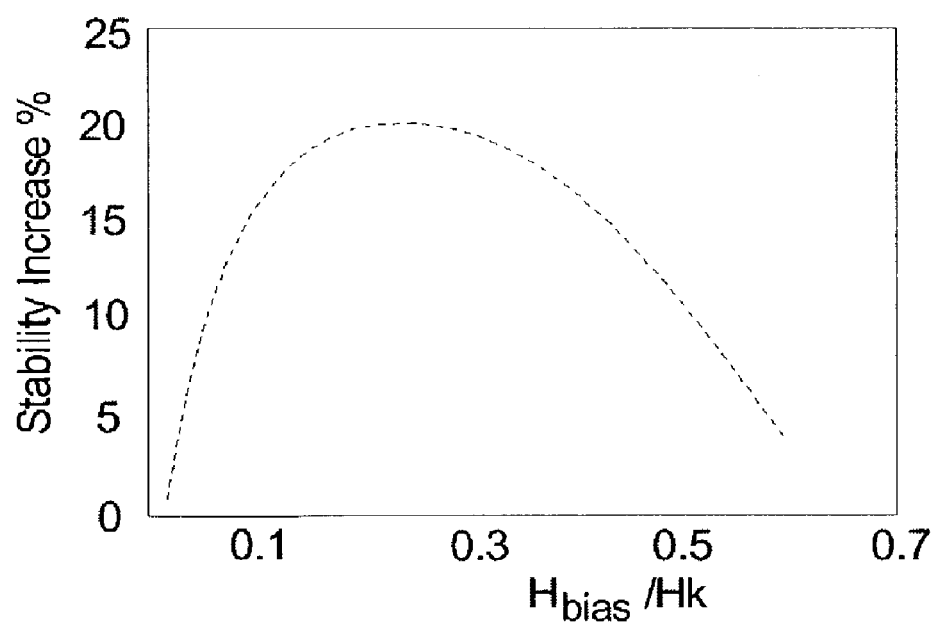
FIG. 7 is a graph of the stability gain versus the bias field for a biased recording layer according to the invention.

The magnetic properties of the recording layer 36 for longitudinal recording are selected to provide an easy axis of switching (anisotropy) which is in the plane of the thin films on the surface of the disk. The anisotropy of the enhancement layer 34 is selected to be orthogonal to the recording layer. Therefore, for an in-plane recording layer, the enhancement layer can have an easy axis perpendicular to the plane of the films. The material composition and deposition conditions for achieving perpendicular anisotropy are outside of the scope of the invention and can be determined using the prior art. The enhancement layer 34 is further designed to saturate at a selected stage during the recording process. When a vertical field is applied, saturating the enhancement layer 34, a vertical exchange field exists normal to the recording layer's longitudinal anisotropy. This perpendicular exchange field acts to reduce the longitudinal field required for switching domains in the recording layer. For example, a 0.1 Hk vertical field reduces the required switching field by as much as 15% according to a first order estimate as shown in the graph of FIG. 7. The enhancement layer is designed to have moderate Ku and Hk with small grain size and volume resulting in small KuV. The KuV is optimized so that it is ferromagnetic on the recording time scale (microseconds and below), but superparamagnetic on any long time scale. The enhancement layer will have small KuV/kT and essentially no remanent magnetization. The enhancement layer will have no significant impact on the energy barrier for switching the domains of the recording layer and, therefore, no effect on long term stability of the domains in the recording layer. The thickness of the enhancement layer should be relatively thin—on the order of 10 nm or less for current disk drives.

FIG. 3 illustrates the relationship in a storage device 10 between the poles of the write head P1 41 and P2 42 and the thin films 21 comprising the recording media according to an embodiment of the invention. The exchange coupling in this embodiment is antiferromagnetic. In this embodiment the write head is a prior art longitudinal write heads, but the magnetic storage device is designed to move the media from the area of the strongest vertical field toward the area of the strongest longitudinal field, that is, in the direction from P2 toward P1. The saturation of enhancement layer 34 during the recording process is designed to occur under the P2 pole of the conventional write head, but not under P1. The vertical field under P2 is much stronger than under P1 since the surface area of P2 facing the media is intentionally made smaller than the surface area of P1 for longitudinal recording. The longitudinal field is largest in the gap between P2 and P1. Therefore, in a storage device embodying the invention with antiferromagnetic coupling using a conventional write head, the magnetic media is moved in the direction from the P2 pole of the write head to the P1 pole which is opposite from the conventional operation. FIG. 4 is an enlarged illustration of the region between P1 and P2 during the recording process and the three pairs of arrows illustrate the switching states at three points in time of a pair of exchange couple domains in the enhancement layer and the recording layer as the media moves under the write head. At time T1 the switching states of domains are in their initial state. The directions of the arrows are not intended to show the true direction of magnetization, but rather will be used symbolically to explain the concepts involved. The arrow for the recording layer is shown as pointing to the lower left at time T1 which is prior to the writing process. The arrow for the enhancement layer is show as pointing to the upper right at time T1. The actual magnetization of the enhancement layer domain at this initial point is irrelevant and can be assumed to be random. As the media moves from left to right in the figure the vertical field under P2 increases and will dominate over the longitudinal field. At approximately time T2 the enhancement layer domains will be designed to switch and saturate in the vertical field generated by the write head at this point. This is illustrated in FIG. 4 by showing the arrow for the enhancement layer pointing down and to the right. The recording layer will not have switched at time T2, but is exchange coupled to the enhancement layer; therefore, the domain in the recording layer will be rotated under the influence of the enhancement layer. The rotation of the magnetization of the recording layer domain after time T2 is shown by the arrow pointing up and to the left. At time T3 the vertical field will have decreased and the longitudinal field increased causing the recording layer domain to switch. Thus, the enhancement layer is designed to saturate in the vertical field under P2 and as the media moves toward P1 the longitudinal field increases so that switching of the recording layer domains occurs near the edge of P1. The influence of the enhancement layer decreases very rapidly, so the stability of the recording layer domain increases quickly after the T3 switching point. In absence of a vertical field the enhancement layer has no significant effect on the recording layer and, therefore, the thermal stability of the recording layer is determined by the properties of the materials in the recording layer according to prior art principles.

A method of longitudinal recording using a medium with a perpendicular enhancement layer and antiferromagnetic coupling according to the invention is described as follows. The media according to the invention is moved across the write head field from a region that has an initially high vertical field into a region with a high longitudinal field. The first event in the switching sequence is that the enhancement layer is saturated in the vertical field due in part to its perpendicular anisotropy, low KuV/kT and moderate Hk. The resulting vertical exchange field with the recording layer rotates the magnetization of the recording layer domains in a controlled way and lowers the longitudinal coercivity of the recording layer. The media continues to move in the head field to a point where the longitudinal field is sufficient to switch the magnetization of the recording layer domain. As the media moves the vertical field decreases rapidly increasing the coercivity and stability of the recording layer domain.

In an embodiment of the invention using ferromagnetic coupling between the recording layer and the enhancement layer, the media is moved in the conventional direction from P1 toward P2. The switching of the domains in the recording layer and the enhancement layer will occur at about the same time. The principles involved are the same as described above in that the vertical component of the tilted field generated by the write head will act on the enhancement layer and generate the exchange field to rotate the magnetization of the recording layer. The longitudinal component of the tilted field will switch the recording layer domains.

The invention can also be implemented with a write head with symmetric poles, that is, a head with approximately equal areas of P1 and P2 facing the recording media. In this embodiment there will not be a region where the vertical dominates and the direction of motion of the media in relation to the write head is not critical. The enhancement layer will still cause the rotation of the magnetization in the recording layer under the influence of the vertical field component generated by the write head and act to lower the dynamic coercivity of the recording layer.

One factor in controlling the vertical field is the saturation point of the enhancement layer. The saturation of the enhancement layer acts to limit the vertical field and prevent an excessive decrease in the longitudinal field. The non-magnetic spacer layer 33 also serves to decouple the soft underlayer from the magnetic recording layer(s) and, therefore, the thickness of the spacer layer is one of the design factors contributing to vertical field.

The detailed example above describes an embodiment in which the enhancement layer is antiferromagnetically coupled to the recording layer, but the invention can be implemented with ferromagnetically coupled layers as well. The principles by which antiferromagnetic or ferromagnetic coupling are achieved are according to the prior art. For example, it is known that the thicknesses of the coupling layer can be selected to achieve either antiferromagnetic or ferromagnetic coupling. An embodiment using ferromagnetic coupling can be implemented according the principles described herein.

An embodiment of the recording media of the invention for use with perpendicular recording uses the principles described above for longitudinal recording, but the anisotropies of the recording layer and enhancement layer are reversed. The write heads used for perpendicular recording are typically single pole designs. Perpendicular head designs can have various types of side shields, trailing shields and aperture shields. The form of shielding for use with the media of the invention must be designed to allow a sufficient longitudinal component in the magnetic field to generate the longitudinal exchange field to cause a rotation of the magnetization in perpendicular anisotropy recording layer in the same manner as described above.

Bias Layer Embodiment

Figure 6:
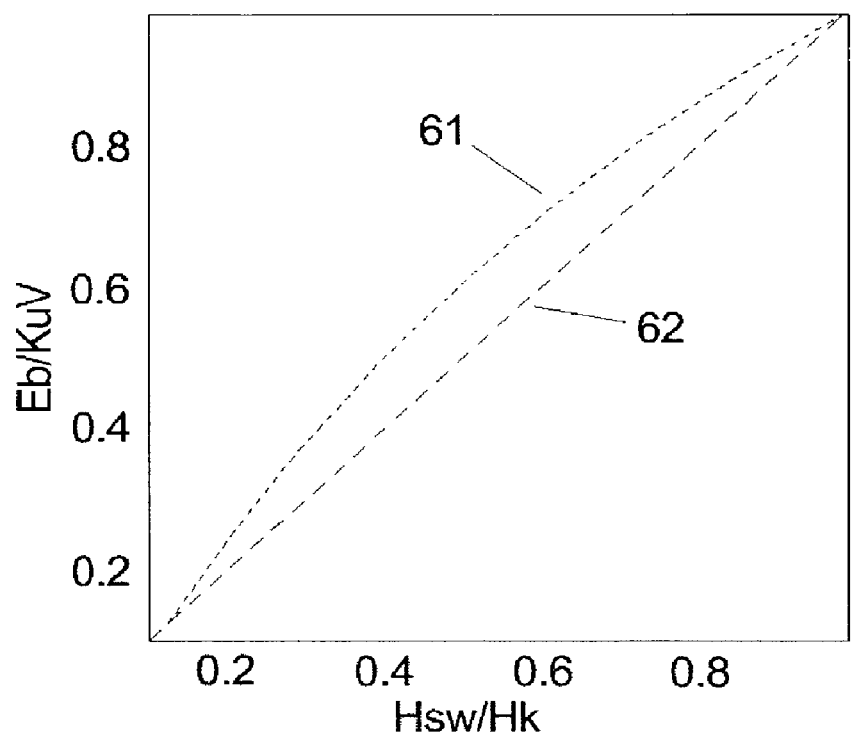
FIG. 6 is a graph of the energy barrier versus the switching field for a biased recording layer according to the invention and a conventional recording layer.

The principle of orthogonal biasing of the recording layer can be implemented in alternative ways. In the preceding examples, the bias is only applied during recording, but improvement of the recording properties are possible even in the case where the bias is always present. The invention is exploiting magnetization dynamics described by the equations in FIG. 5 which give a $1^{st}$ order estimate of the uniaxial anisotropy with an orthogonal biasing field. The energy barrier $E_b$ is given by equation 51 and the switching field $H_{sw}$ is given by equation 52. The enhancement layer of the invention uses this principle by creating an exchange field that is orthogonal to the easy axis of the recording layer when the head is applying a magnetic field. The result is a rotation of the magnetization of the domains in the recording layer which lowers the dynamic coercivity during the writing process. A static bias field will lower the switching field and energy barrier as shown in FIG. 6 which is a graph of the energy barrier versus the switching field for a selected biased recording layer 61 according to the invention and a conventional recording layer 62. However, for a given switching field the bias media will still have a higher energy barrier as the graph shows. FIG. 7 is a graph of the stability gain versus the bias field for a biased recording layer according to the invention.

Figure 8:
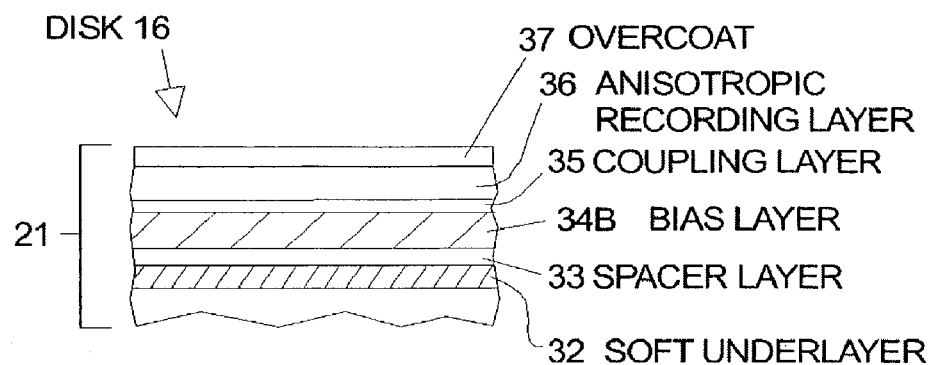
FIG. 8 is an illustration of section of a thin film disk according to an embodiment the invention taken perpendicular to the plane of the thin films which includes an orthogonal anisotropy bias layer for perpendicular recording.

An embodiment of a recording medium according to these principles, for example, can have a perpendicular oriented recording layer used with in conjunction with a radially oriented bias layer for perpendicular recording. A perpendicularly oriented recording layer can be rotated toward the cross-track direction by the bias layer. The layer structure of the media will be the same as shown in FIG. 2 except that the enhancement layer will become the bias layer 34B as shown in FIG. 8. The high KuV (higher than the recording layer) and anisotropy of the bias layer is designed to have high thermal stability and minimize the rotation of magnetization with the head field. Whereas the enhancement layer described above has a negligible remanent magnetization, bias layer has a high remanent magnetization and will not be switched by the read head. In this type of embodiment the bias layer can either be DC magnetized which gives lower noise or be demagnetized (with symmetric track edges) since random magnetization will still have the effect of rotating the magnetization in the recording layer.

Figure 9:
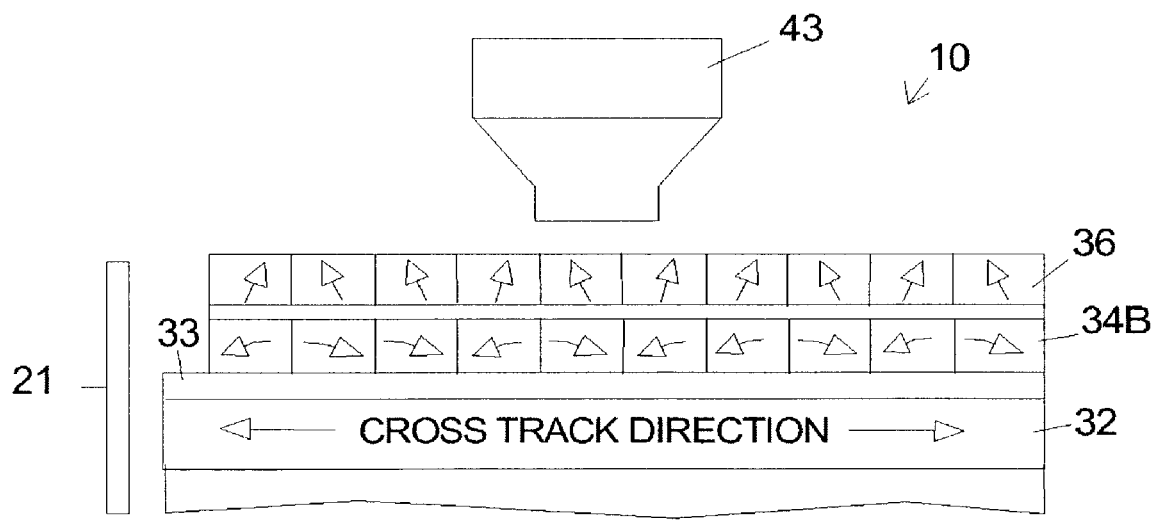
FIG. 9 is a symbolic illustration of the respective magnetization directions of domains in the recording layer and orthogonal bias layer in an embodiment of the invention for perpendicular recording with radial, cross-track anisotropy in the bias layer.

FIG. 9 is a symbolic illustration of the respective magnetization directions of domains in the recording layer and orthogonal bias layer in an embodiment of the invention for perpendicular recording with radial, cross-track anisotropy in the bias layer.

Figure 10:
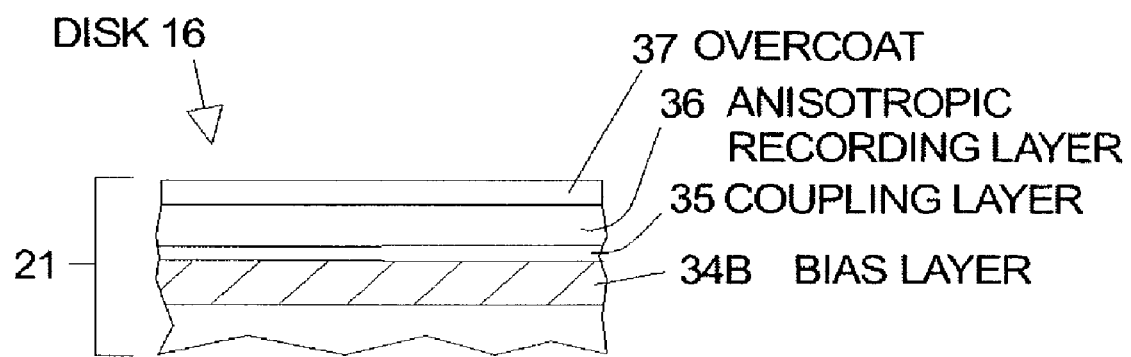
FIG. 10 is an illustration of section of a thin film disk according to an embodiment the invention taken perpendicular to the plane of the thin films which includes an orthogonal anisotropy bias layer for longitudinal recording.

For longitudinal recording an embodiment of a recording medium according to these principles can have a circumferentially oriented recording layer (easy axis parallel to the track direction) used with in conjunction with a radially oriented bias layer. In this embodiment the magnetization of the recording layer is rotated in the plane of the film toward the radial, cross-track direction by the exchange field. The layer structure of the media will be the same as shown in FIG. 10. In this embodiment there is no need for the SUL or the spacer layer, since the bias layer has in-plane anisotropy with cross-track orientation.

A thin film disk according to the invention can be fabricated using standard thin film fabrication techniques. The invention has been described with respect to particular embodiments, but other uses and applications for the methods and structures according to the invention will be apparent to those skilled in the art.

The invention claimed is:

1. A magnetic recording medium comprising:
   a ferromagnetic recording layer with a first anisotropy for magnetic recording;
   a coupling layer under the recording layer; and
   an orthogonal anisotropy layer with a second anisotropy orthogonal to the first anisotropy and exchange coupled to the recording layer, the orthogonal anisotropy layer is ferromagnetic over a first timescale and has negligible remanent magnetization over a second timescale that is longer than the first timescale.

2. The magnetic recording medium of claim 1 further comprising:
   a spacer layer under the orthogonal anisotropy layer; and
   a magnetically soft underlayer under the spacer layer.

3. The magnetic recording medium of claim 1 wherein the orthogonal anisotropy layer has a small KuV/kT such that it is ferromagnetic over a timescale of microseconds or less and is superparamagnetic with negligible remanent magnetization for times greater than microseconds.

4. The magnetic recording medium of claim 1 wherein the orthogonal anisotropy layer has an in-plane anisotropy in a radial, cross-track direction.

5. The magnetic recording medium of claim 1 for use in longitudinal recording wherein the first anisotropy is an easy axis in a plane of the recording medium and the second anisotropy is an easy axis perpendicular to the plane of the recording medium.

6. The magnetic recording medium of claim 1 wherein the orthogonal anisotropy layer has a property of saturating in a predetermined magnetic field that does not saturate the recording layer.

7. The magnetic recording medium of claim 1 for use in perpendicular recording wherein the first anisotropy is an easy axis perpendicular to a plane of the recording medium and the second anisotropy is an easy axis in the plane of the recording medium.

8. The magnetic recording medium of claim 1 wherein the orthogonal anisotropy layer and the recording layer are antiferromagnetically coupled.

9. The magnetic recording medium of claim 1 wherein the orthogonal anisotropy layer and the recording layer are ferromagnetically coupled.

* * * * *